United States Patent [19]
Abileah et al.

[11] Patent Number: 5,715,028
[45] Date of Patent: *Feb. 3, 1998

[54] LCD WITH REDUCED CANOPY REFLECTION

[75] Inventors: Adiel Abileah, Farmington Hills; Patrick F. Brinkley, Bloomfield; Gang Xu, Northville, all of Mich.

[73] Assignee: OIS Optical Imaging Systems, Inc., Northville, Mich.

[*] Notice: The term of this patent shall not extend beyond the expiration date of Pat. No. 5,579,139.

[21] Appl. No.: 744,950

[22] Filed: Nov. 7, 1996

Related U.S. Application Data

[63] Continuation of Ser. No. 482,993, Jun. 7, 1995, Pat. No. 5,579,139.

[51] Int. Cl.$^6$ ............... G02F 1/1347; G02F 1/1335
[52] U.S. Cl. ............... 349/117; 349/75; 349/102
[58] Field of Search ............... 349/117, 96, 102, 349/74

[56] References Cited

U.S. PATENT DOCUMENTS

| | | | |
|---|---|---|---|
| 3,900,248 | 8/1975 | Nagasaki | 349/117 |
| 4,025,161 | 5/1977 | La Roche | 349/117 |
| 4,266,859 | 5/1981 | Togashi | 349/112 |
| 4,272,162 | 6/1981 | Togashi et al. | 349/117 |
| 4,385,806 | 5/1983 | Fergason | 349/117 |
| 4,701,028 | 10/1987 | Clerc et al. | 349/117 |
| 4,995,704 | 2/1991 | Yamamoto et al. | 349/96 |
| 5,066,108 | 11/1991 | McDonald | 349/98 |
| 5,138,474 | 8/1992 | Arakawa | 349/117 |
| 5,150,235 | 9/1992 | Haim et al. | 349/117 |
| 5,237,438 | 8/1993 | Miyashita et al. | 349/117 |
| 5,268,775 | 12/1993 | Zeidler | 349/5 |
| 5,344,916 | 9/1994 | Harris et al. | 528/353 |
| 5,369,513 | 11/1994 | Akatsuka et al. | 349/117 |
| 5,375,006 | 12/1994 | Haas | 349/117 |
| 5,490,006 | 2/1996 | Masumoto et al. | 349/117 |
| 5,510,913 | 4/1996 | Hashimoto et al. | 349/117 |
| 5,579,139 | 11/1996 | Abileah et al. | 349/117 |

FOREIGN PATENT DOCUMENTS

| | | |
|---|---|---|
| 350383 | 1/1990 | European Pat. Off. |
| 424950 | 5/1991 | European Pat. Off. |
| 3705424 | 9/1988 | Germany . |
| 2254882 | 10/1990 | Japan . |
| 3174512 | 7/1991 | Japan . |
| 5157913 | 6/1993 | Japan . |

OTHER PUBLICATIONS

"Optics" by Eugene Hecht, pp. 296–300, 1987.

*Primary Examiner*—William L. Sikes
*Assistant Examiner*—Toan Ton
*Attorney, Agent, or Firm*—Myers Liniak & Berenato

[57] ABSTRACT

A liquid crystal display and corresponding method are provided for reducing display image reflections off of a reflection point on an external medium (e.g. cockpit canopy or automotive windshield). A retarder is provided on the front side of the display so that the polarization direction of the display image is substantially parallel to the plane of incidence when the image reaches the reflection point. Additionally, the angle of incidence $\Theta_i$ is substantially matched to the Brewster angle $\Theta_p$ in order to maximize the reduction of reflection at the reflection point. The retarder has a retardation value of from about 220–320 nm according to certain embodiments, and is a ½ λ retarder according to preferred embodiments.

5 Claims, 8 Drawing Sheets

Fig. 1(b) (Prior Art)
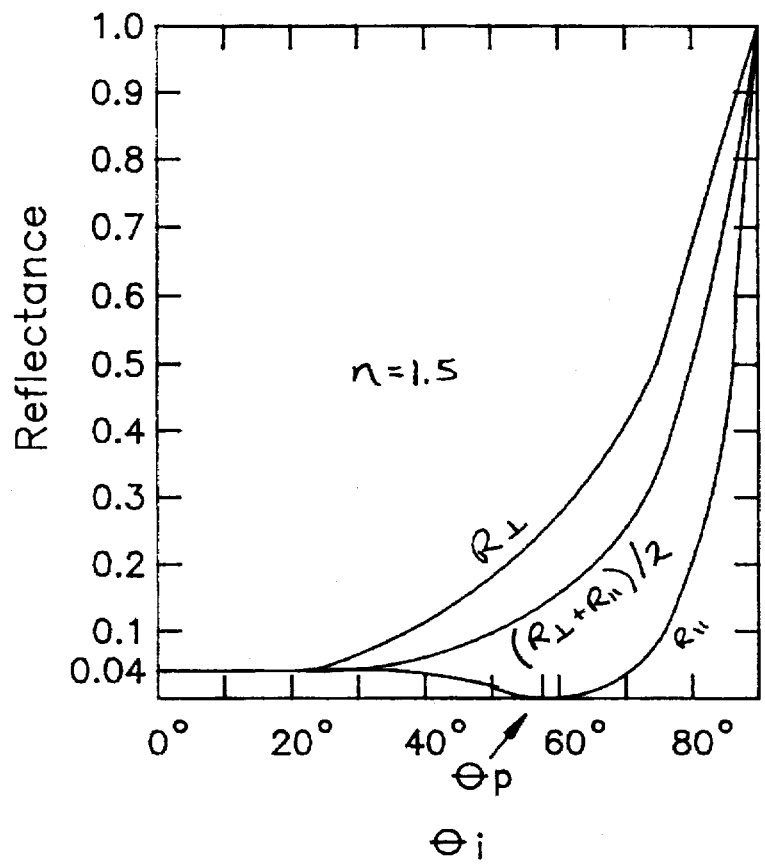
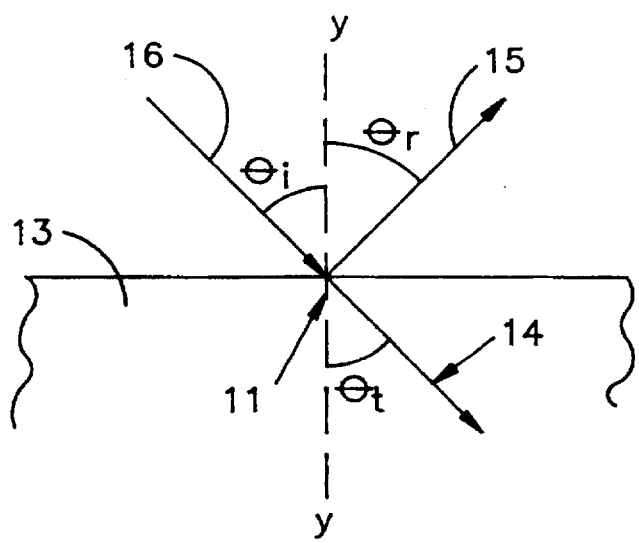
Fig. 1(c) (Prior Art)

LCD WITH REDUCED CANOPY REFLECTION

This is a continuation, of application Ser. No. 08/482,993 filed Jun. 7, 1995, now U.S. Pat. No. 5,579,139.

This invention relates to a livid crystal display designed so as to reduce image reflectance off of an exterior medium such as an automotive windshield or a cockpit canopy, and method of implementing same. More particularly, this invention relates to a liquid crystal display having a retarder exterior the front polarizer for the purpose of changing the polarization direction of the image after it leaves the front polarizer so that it is substantially parallel to the incident plane when the image reaches the reflection point on the exterior medium so that image reflections off of the medium are reduced.

BACKGROUND OF THE INVENTION

Liquid crystal displays (LCDs) find wide usage in applications such as air vehicle cockpits, automobile dashboards, etc. Such LCDs generally include a liquid crystal layer sandwiched between a pair of polarizers and a pair of electrodes. Voltage is selectively applied by the electrodes across the liquid crystal (LC) layer so as to selectively portray an image to the viewer by way of the front polarizer.

FIG 1(a) illustrates prior art liquid crystal display 3 in an air vehicle cockpit 5 occupied by pilot 7 and copilot 9. In prior art cockpit (or automobile dashboard) applications such as this, situations commonly arise where a portion of the image 13 emitted from the active matrix liquid crystal display (AMLCD) 3 is reflected at point 11 off of cockpit canopy 13 toward copilot 9, while another portion of the image is transmitted through canopy 13. Air vehicle cockpit 5 as shown in FIG. 1(a) is designed so as to house copilot 9 directly behind and above pilot 7 as illustrated. Thus, when a portion 15 of the image 13 from LCD 3 is reflected off of canopy 13 at reflection point 11, it can be seen by copilot 9 when the copilot is looking out of the cockpit. The other portion or remainder of the image is transmitted through the canopy as shown at 14. This reflection 15 from point 11 is, of course, undesirable in view of the fact that copilot 9 typically wishes to locate targets and the like exterior the aircraft and does not wish to be interfered with by such display reflections. Needless to say, it is undesirable to have the pilot's or copilot's vision obstructed during flight operations due to display image reflections off of the canopy.

The above-referenced display reflection problems inside of aircraft cockpits are most severe at night when reflections 15 exceed the intensity of the light or environment outside of the cockpit, but are also present during daylight hours. The majority of undesirable reflections 15 come from the interface between the air inside of the cockpit and the material (e.g. glass or plastic) of canopy 13. Typically, the index of refraction of cockpit canopy 13 is about 1.5. Depending upon the shape of the canopy, reflections 15 may be concentrated in convex curved areas or mirror-like in flat canopy areas.

In view of the above, it is clear that there exists a need in the art for a liquid crystal display and method of implementation for reducing display reflections off of exterior mediums such as canopies of aeronautic cockpits.

FIG. 1(b) is a reflectance versus incident angle $\Theta_i$ graph from "Optics", by Eugene Hecht, 1987. As shown in FIG. 1(b), for an incoming unpolarized wave made up of two incoherent orthogonal polarization states, only the component polarized normal ($R_{perpendicular}$) to the incident plane and therefore parallel to the surface of the medium will be reflected. The incident plane is defined by the line connecting the reflection point on the exterior medium and the display front surface and the medium surface normal. The component ($R_{parallel}$) parallel to the plane of incidence is not reflected and is transmitted through the medium as shown at 14. The particular angle of incidence for which this situation occurs is designated by $\Theta_p$ and is referred to in the art as the polarization angle or Brewster's angle, whereupon $\Theta_p + \Theta_t = 90°$. Therefore, from Snell's Law, $$n_i \sin \Theta_p = n_t \sin \Theta_t$$

and the fact that $\Theta_t = 90° - \Theta_p$, it follows that $$n_i \sin \Theta_p = n_t \cos \Theta_p$$

and $\tan \Theta_p = n_t/n_i$.

This is known as Brewster's Law. The above parameters and equations are defined in "Optics", by Eugene Hecht, the disclosure of which is incorporated herein by reference.

Thus, when the incident light ray or beam is in air ($n_i=1$) and if the transmitting medium (i.e. exterior medium such as canopy 13 or the like) is glass, in which case $n_t=1.5$, the polarization angle $\Theta_p$ is about 56°. Similarly, this concept may be exemplified by the situation when an unpolarized beam strikes the surface of a pond ($n_t=1.33$ for water) at an angle of 53°, the reflected beam will be completely polarized with its E-field perpendicular to the plane of incidence or, if you like, parallel to the water's surface.

For linearly polarized light having its E-field parallel to the plane of incidence, the "amplitude reflection coefficient" is defined as $r_{parallel} = (E_{or}/E_{oi})_{parallel}$, that is, the ratio of the reflected to incident electric field amplitudes. Similarly, when the electric field is normal to the incident plane, $r_{perpendicular} = (E_{or}/E_{oi})_{perpendicular}$. The corresponding irradiance ratio (the incident and reflected beams have the same cross-sectional area) is known as the "reflectance", and since irradiance is proportional to the square of the amplitude of the field, $$R_{parallel} = r^2_{parallel}$$

and $$R_{perpendicular} = r^2_{perpendicular}$$

Squaring the appropriate Fresnel equations results in $$R_{Parallel} = \frac{\tan^2(\Theta_i - \Theta_t)}{\tan^2(\Theta_i + \Theta_t)}$$

and $$R_{perpendicular} = \frac{\sin^2(\Theta_i - \Theta_t)}{\sin^2(\Theta_i + \Theta_t)}$$

The reflectance for linearly polarized light with E or a polarization direction parallel to the plane of incidence vanishes and the beam is completely transmitted when the angle of incidence $\Theta_i$ equals Brewster's angle $\Theta_p$. This is shown in FIG. 1(b) where $n_t=1.5$ and Brewster's angle $\Theta_p$ equals about 56°, so that the reflectance of $R_{parallel}$ is substantially zero when $\Theta_i$ substantially matches $\Theta_p$ or Brewster's angle. FIG. 1(b) is a plot for the particular case where $n_i=1$ and $n_t=1.5$. The middle curve corresponds to incident natural light. As shown, when the polarization direction of incoming linearly polarized light is substantially perpendicular to the plane of incidence at Brewster's angle

3 of about 56°, substantial reflection results at reflection point 11. However, at Brewster's angle $\Theta_p$ of about 56°, when the direction of polarization of incoming light is substantially parallel to the plane of incidence (i.e. parallel to the Y-axis), the result is substantially no reflectance and nearly complete transmission at point 11. As shown by the middle curve in FIG. 1(b), when the polarization direction is mixed, reflection from point 11 results.

FIG. 1(c) illustrates incident light 16 being reflected at point 11 off of canopy 13. Reflection 15 and transmission 14 define angles $\Theta_r$ and $\Theta_t$ with the Y-axis (normal to the surface of medium 13) respectively. The angle of incidence $\Theta_i$ is also shown in FIG. 1(c).

U.S. Pat. No. 4,025,161 discloses a liquid crystal display device including a quarter wavelength retarder disposed on the front of the display so that the front polarizer is between the liquid crystal material and the retarder. The quarter wavelength retarder together with the front polarizer form a circular polarizer in the '161 patent. Unfortunately, if the liquid crystal display of the '161 patent were positioned in place of display 3 in FIG. 1(a), undesirable image reflection 15 would still occur in a substantial amount because the circularly polarized display image incident upon reflection point 11 would not be substantially polarized parallel to the plane of incidence and therefore reflection 15 toward copilot 9 would result thus inhibiting the copilot's view. In other words, circularly polarized light incident upon canopy 13 at reflection point 11 (even when $\Theta_i=\Theta_p$) in FIG. 1(a) would be reflected at 15 toward viewer 9, this, of course, being undesirable.

U.S. Pat. No. 4,266,859 discloses a liquid crystal display of the reflective dichroic type, including upper and lower quarter wavelength retarders. Again, the LCD of the '859 patent suffers from the same drawbacks as those discussed above with respect to the '161 patent.

In view of the above, it is clear that there exists a need in the art for a liquid crystal display designed so as to reduce image reflection off of exterior mediums (e.g. automotive windshields or cockpit canopies) at a reflection point and a method of implementing same. There also exists a need in the art for a liquid crystal display which when arranged in an appropriate manner, causes the image emitted toward a reflection point on the exterior medium to have a polarization direction substantially parallel to the plane of incidence at the reflection point and $\Theta_i$ to substantially match $\Theta_p$ so that substantially no reflection results and the image is mostly transmitted through the medium instead of being reflected thereby.

It is a purpose of this invention to fulfill the above-described needs, as well as other needs which will become apparent to the skilled artisan from the following detailed description of this invention.

SUMMARY OF THE INVENTION

Generally speaking, this invention fulfills the above-described needs in the art by providing a method of reducing liquid crystal display image reflections off of the canopy of an air vehicle, the method comprising the steps of:

providing a liquid crystal display in a cockpit of the air vehicle;

causing the display to emit an image toward a reflection point on the canopy, the canopy having an index of refraction of about 1.5;

arranging the display so that the angle of incidence $\Theta_i$ of the image on the canopy at the reflection point is about 56°; and

4 retarding the image after it leaves the display but before it reaches the reflection point on the canopy so that the polarization direction of the image when it reaches the reflection point on the canopy is approximately parallel to the plane of incidence thereby substantially reducing image reflection off of the canopy at the reflection point and permitting a substantial portion of the image to be transmitted through the canopy.

This invention further fulfills the above-described needs in the art by providing a method of reducing liquid crystal display image reflections off of a reflection point on an external medium, the method comprising the steps of:

providing a liquid crystal display having a retarder disposed adjacent the front polarizer so that the front polarizer is located between the retarder and the liquid crystal layer;

causing an image to be emitted from the display in an incident direction toward the reflection point; and retarding the image using the retarder so that the image has a polarization direction substantially parallel to the incident plane when the image reaches the reflection point on the medium, the incident plane being defined by the incident direction and a direction normal to the medium surface at the reflection point.

According to certain preferred embodiments of this invention, the method further includes the step of choosing a retardation value "RV" for the retarder so that "RV" is approximately defined by:

$RV=d\cdot\Delta n/\cos\phi$ where "d" is the thickness of the retarder, "$\Delta n$" is the birefringent value of the retarder, and $\phi$ is no greater than about 30° and is the angle defined between the incident direction extending from the display to the reflection point and a line normal to the display front surface.

This invention further fulfills the above-described needs in the art by providing a liquid crystal display for providing an image to a viewer, the display comprising:

a liquid crystal layer adjacent at least one electrode, the electrode for selectively applying a voltage across the liquid crystal layer;

front and rear linear polarizers sandwiching the liquid crystal layer therebetween, the front polarizer adapted to be positioned closest to the viewer; and a retarder disposed adjacent the front polarizer so that the front polarizer is located between the liquid crystal layer and the retarder, and wherein the retarder has a retardation value of from about 220 to 330 nm so as to reduce canopy reflection in cockpit applications.

In certain preferred embodiments of this invention, the retarder has a retardation value of from about 270 to 290 nm (½λ).

This invention still further satisfies the above-described needs in the art by providing a liquid crystal display for reducing image reflection at a reflection point on an exterior medium, the display comprising:

a front polarizer having a transmission axis;

a liquid crystal layer; and a retarder disposed adjacent the front polarizer so that the front polarizer is located between the retarder and the liquid crystal layer, the retarder having a retardation axis angularly arranged so that it substantially bisects the angle defined between the transmission axis of the front polarizer and a direction defined in the plane of incidence so as to reduce image reflection off of the exterior medium at the reflection point.

This invention will now be described with reference to certain embodiments thereof as illustrated in the following drawings.

IN THE DRAWINGS

FIG. 1(b) is a prior art reflectance versus incident angle graph illustrating that when Brewster's angle is met and the polarization direction of the incident light is substantially parallel to the plane of incidence, reflection off of the medium is substantially reduced or even eliminated.

Figure 1A:
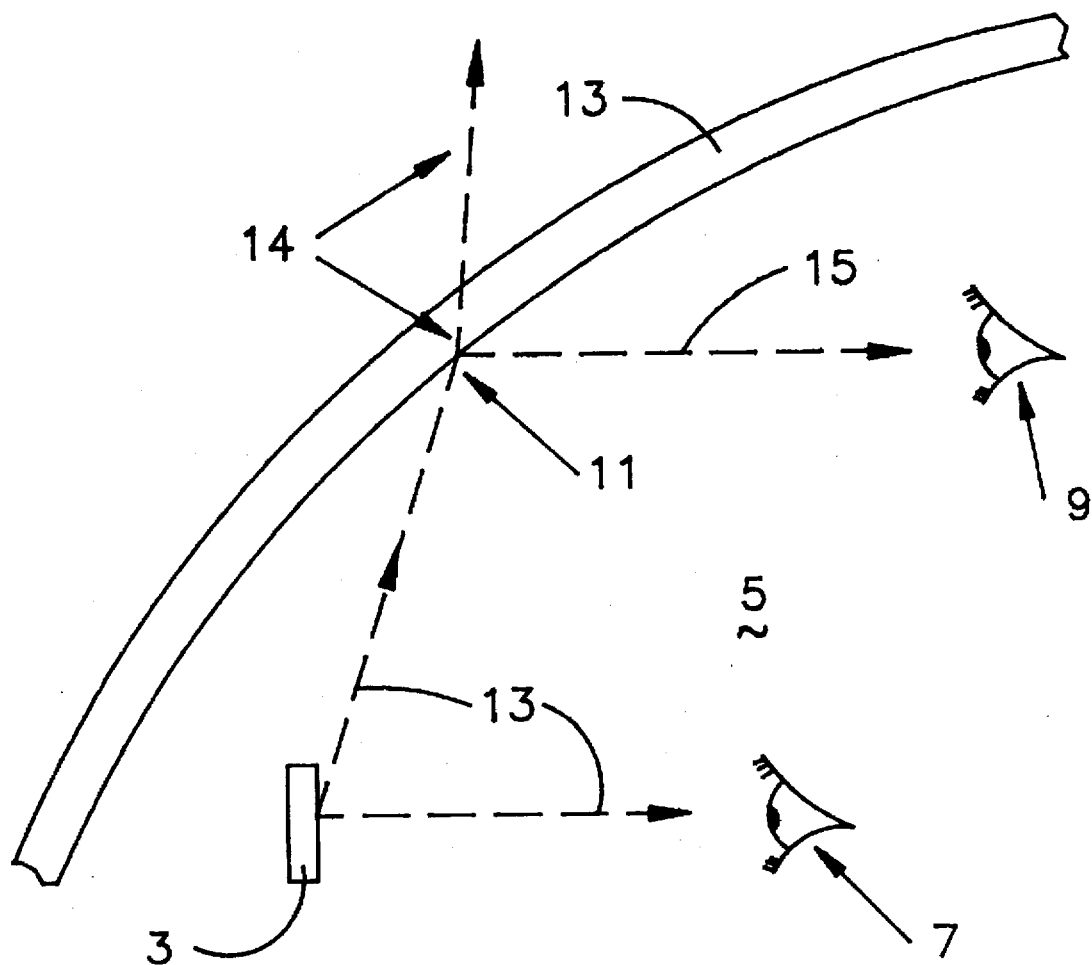
FIG. 1(a) is a diagram of a prior art liquid crystal display located in the cockpit of an air vehicle, this figure illustrating undesirable image reflection off of a reflection point located on the canopy of the cockpit.

FIG. 1(c) is an illustration of incident light impinging at incident angle $\Theta_i$ upon medium 13 so that a portion 14 is transmitted through the medium and a portion 15 is reflected off of the medium at point 11.

Figure 2:
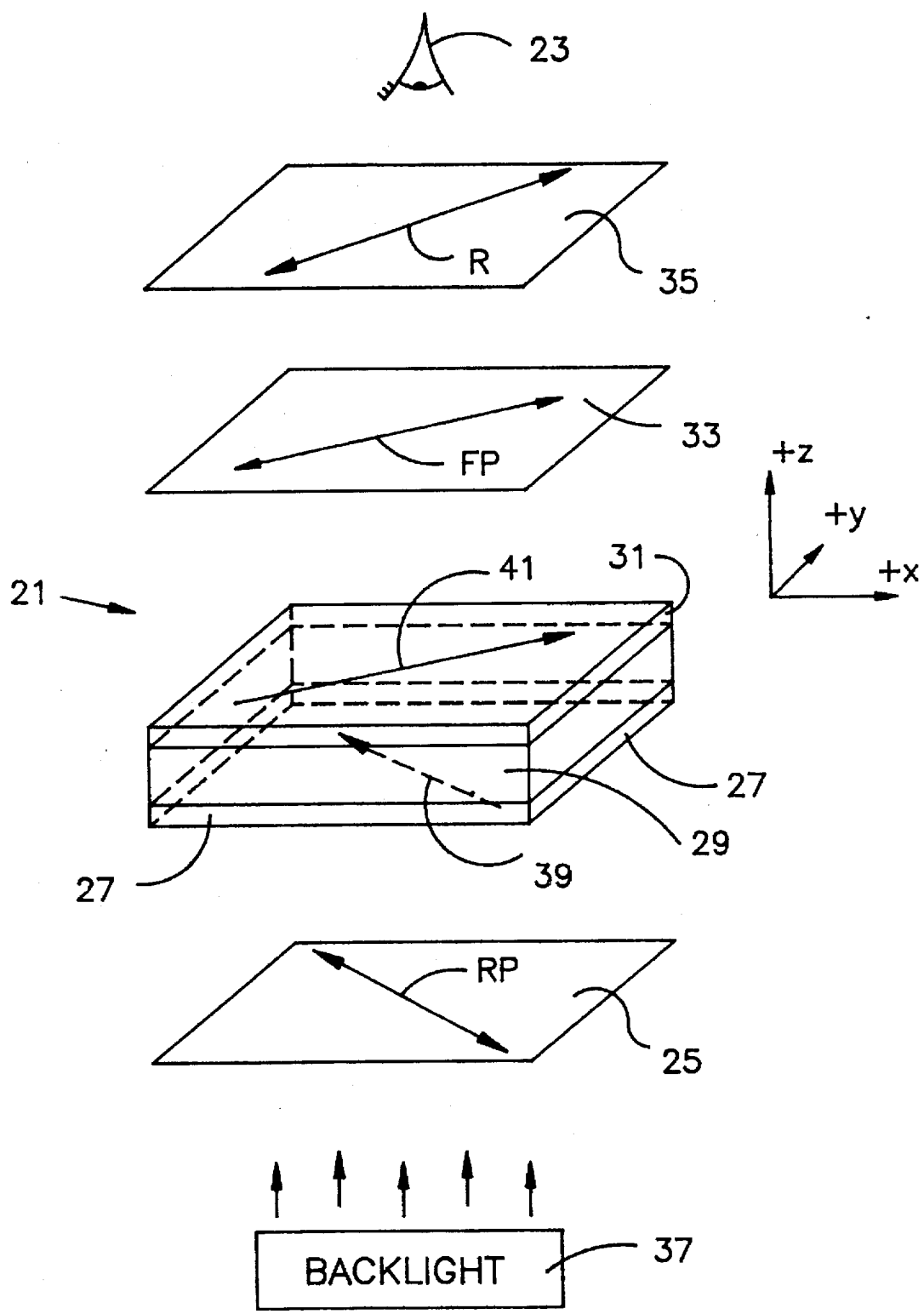

FIG. 2 is a schematic diagram of the optical components of a liquid crystal display according to a first embodiment of this invention.

Figure 3:
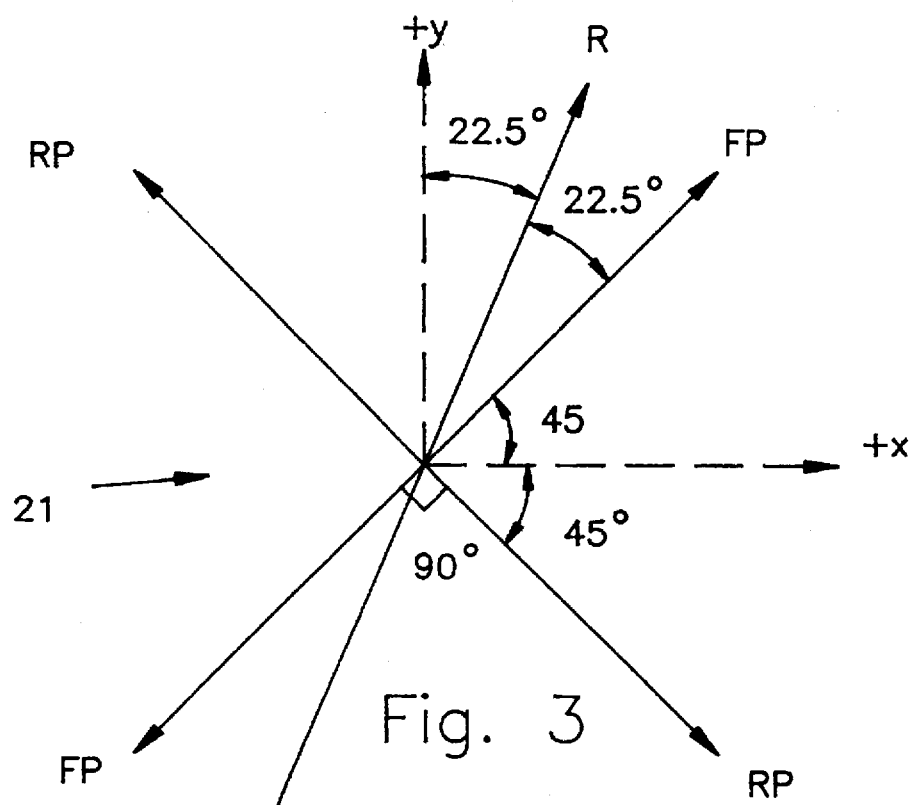

FIG. 3 illustrates the angular relationships of the axes of the optical components set forth in FIG. 2.

Figure 4:
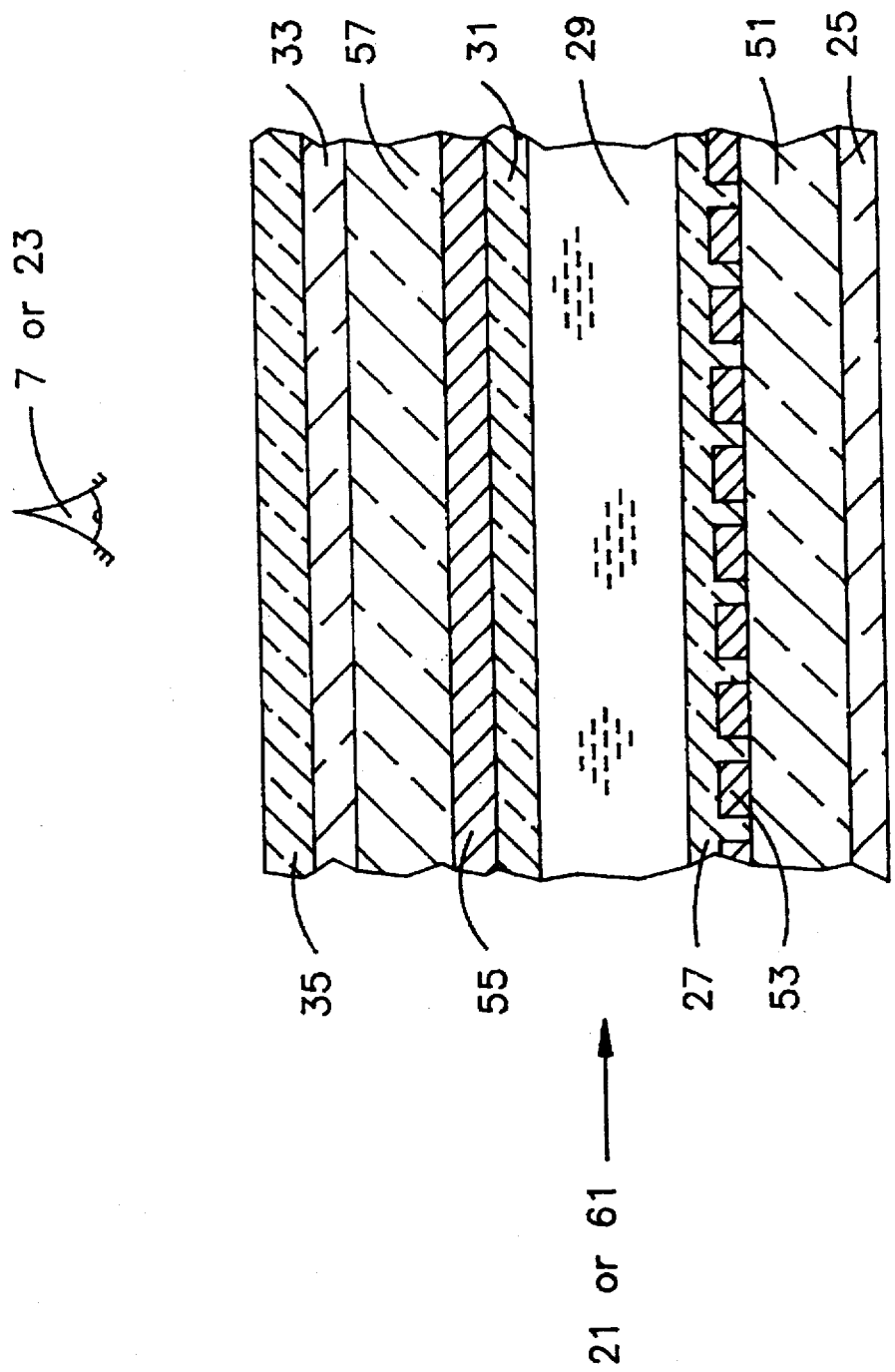

FIG. 4 is a side elevational cross-sectional view of a liquid crystal display according to the first embodiment of this invention, this display including the optical components set forth in FIGS. 2–3.

Figure 5:
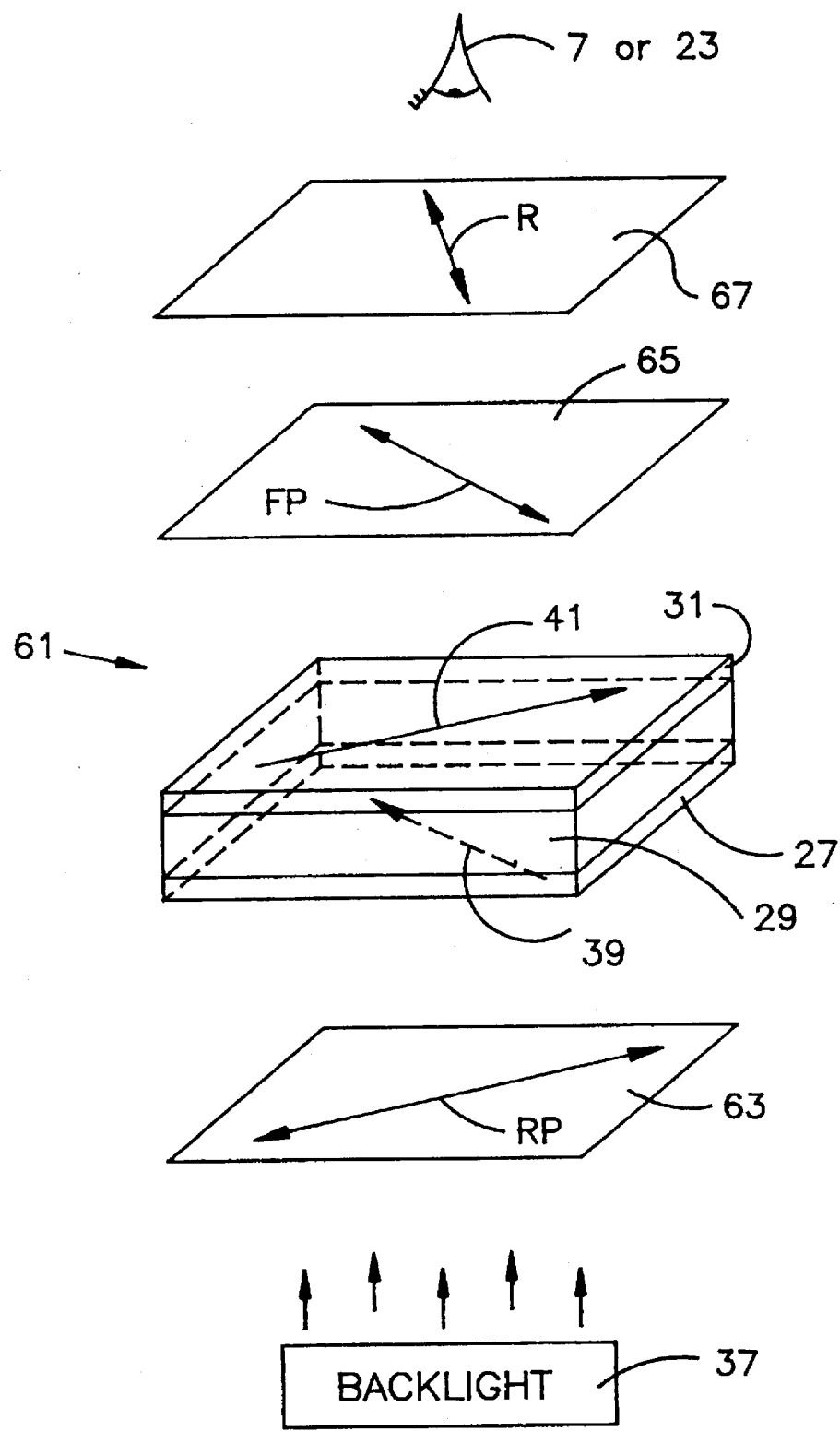

FIG. 5 is a schematic illustration of the optical components of a liquid crystal display according to a second embodiment of this invention.

Figure 6:
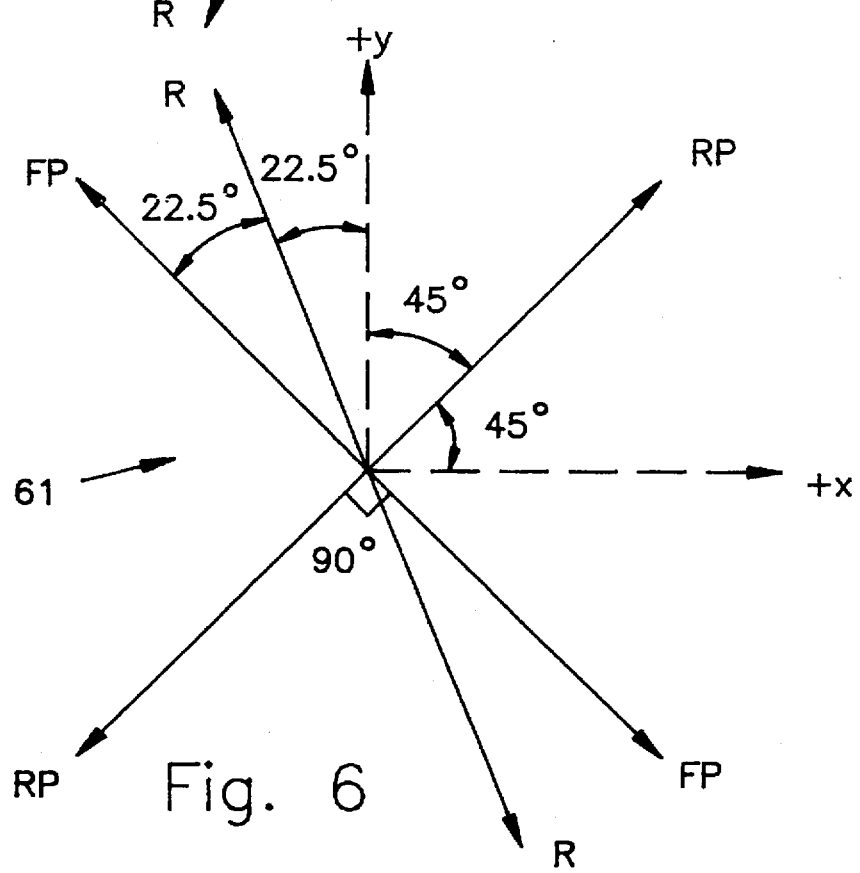

FIG. 6 is a diagram illustrating the angular relationships between the optical components of the second embodiment of this invention set forth in FIG. 5.

Figure 7:
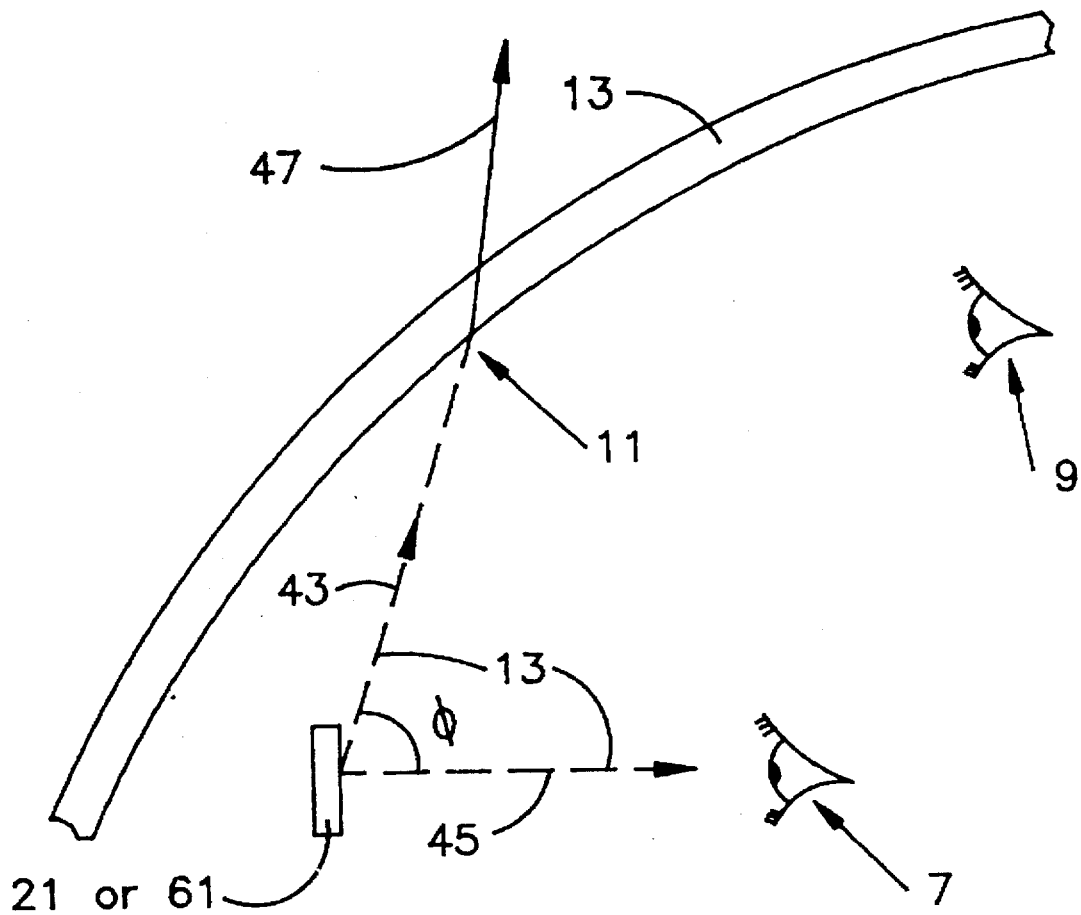

FIG. 7 is an illustration of the liquid crystal display of both the first and second embodiments of this invention located in the cockpit of an air vehicle in such a manner so that image reflection off of the canopy at the reflection point relevant to the copilot is substantially eliminated.

Figure 8:
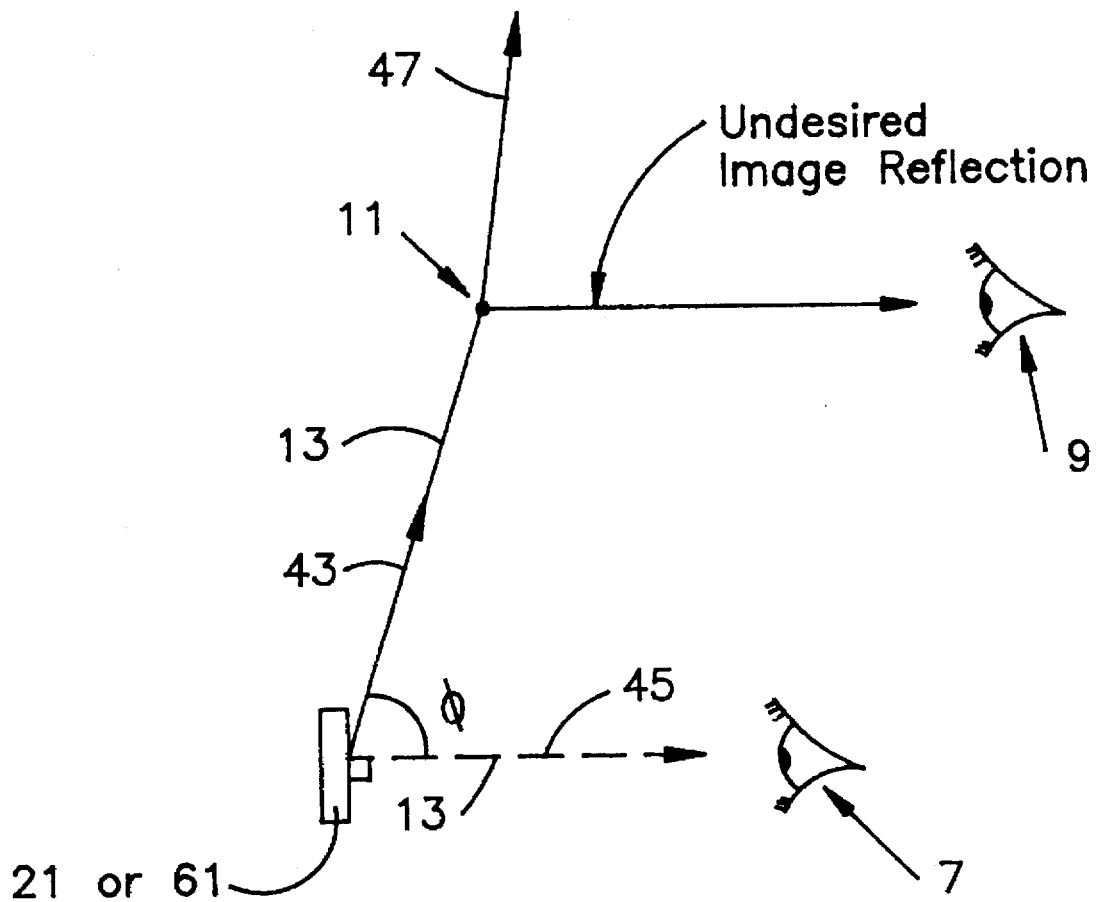

FIG. 8 is an optical diagram defining angle φ with respect to the equation: R=d·Δn/Cos φ when φ is defined by the angle between the normal to the display front surface and the incident direction extending from the display toward the reflection point.

DETAILED DESCRIPTION OF CERTAIN EMBODIMENTS OF THIS INVENTION

Referring now more particularly to the accompanying drawings in which like reference numerals indicate like parts throughout the several views.

FIG. 2 is an exploded schematic view of twisted nematic active matrix liquid crystal display (AMLCD) 21 according to a first embodiment of this invention. AMLCD 21 includes from the rear forward toward the viewer 23 (e.g. pilot), rear or entrance linear polarizer 25, rear orientation film 27, twisted nematic liquid crystal layer 29, front orientation film 31, front linear polarizer 33, and finally retarder 35 located on the front surface of the display adjacent the front polarizer.

Retarder 35 functions to alter the polarization direction of the image or light rays leaving the front polarizer 33 so that the direction of polarization of the image when it reaches reflection point 11 (see FIG. 7) is substantially parallel to the plane of incidence (i.e. the YZ plane). AMLCD 21 is arranged so that the angle of incidence $\Theta_i$ on medium 13 at point 11 is substantially matched to Brewster's angle so that image reflection off of medium 13 at point 11 is substantially eliminated and the image is transmitted through the medium. For example, when the index of refraction of medium 13 is about 1.5, the display is arranged so that $\Theta_i$ is about 56°. In such a manner, image reflections at point 11 are reduced by up to a factor of about 10.

Backlight assembly 37 is a conventional fluorescent backlight which emits light having a dominant wavelength defined in the green region of about 550 to 560 nm. For example, the backlight of U.S. Pat. No. 5,161,041, the disclosure of which is hereby incorporated herein by referenced may be used to illuminate liquid crystal display 21. Alternatively, any other conventional fluorescent backlights may be used as backlight 37.

Rear polarized 25 and front polarizer 33 of display 21 are conventional in nature and have linear transmission axes RP and FP respectively which are, as illustrated, substantially perpendicular to one another so as to define a normally white (NW) twisted nematic display. Alternatively, the polarizer axes RP and FP may be arranged so as to be substantially parallel to one another so as to define a normally black display in alternative embodiments of this invention.

When a normally white display is defined as illustrated in FIG. 2, transmission axes RP and FP of rear polarizer 25 and front polarizer 33 respectively are oriented so as to allow light emitted from backlight 37 to be twisted about 90° C. by liquid crystal layer 29 when substantially no voltage is being applied to the liquid crystal layer (i.e. the liquid crystal layer is in the off state). When LC layer 29 is in the off state, the light, after being twisted by layer 29, proceeds through front polarizer 33 by way of transmission axis FP before reaching retarder 35. Normally white LCDs, while in the off or unenergized state, allow light from the backlight assembly to be transmitted therethrough thus reaching the viewer. However, when the LC material of an NW display is energized (i.e. a voltage is applied thereto via electrodes), the substantially perpendicular nature of the display's polarizer transmission axes act to block substantially all light from being transmitted through the LCD and reaching viewer 23. Hence, when LC layer 29 is energized fully, substantially no light reaches viewer 23 and the display appears dark, but the same display appears light when no or substantially little voltage is applied across LC layer 29.

Rear and front orientation films 27 and 31 respectively are made of a conventional polyimide material according to certain embodiments of this invention, and define rear buffing direction 39 and front buffing direction 41 respectively. As shown, rear buffing direction 39 of rear orientation film 27 is substantially parallel to transmission axis RP of rear polarizer 25 according to this embodiment. Likewise, front buffing or orientation direction 41 of front orientation film 31 is substantially parallel to transmission axis FP of front linear polarizer 33. Thus, rear buffing direction 39 is substantially at a right angle (about 90°) with respect to front buffing direction 41.

Linearly polarizers 25 and 33 according to certain embodiments of this invention may be high efficiency linear polarizers available commercially from Nitto-Denko, Model No. G1220-DUN. The liquid crystal material of LC layer 29 may be Model No. ZLI-4718, commercially available from Merck, and occupies a cell gap (d) of about 5 to 6 μm in certain embodiments of this invention. The birefringent value of the liquid crystal material may be about 0.084 according to such certain embodiments of this invention.

Retarder 35 having retardation axis R is laminated to the front surface of front polarizer 33 by way of a conventional index matching adhesive so that front polarizer 33 is sandwiched between retarder 35 and liquid layer 29. Retarder 35 is a ½λ retarder according to certain embodiments of this invention, so that the retardation value "RV" of retarder 35 is chosen to be about ½ of the dominant wavelength emitted from backlight 37. Thus, when, for example, the dominant wavelength emitted by fluorescent backlight 37 is about 560 nm (dominant green), then a retardation value of about 280 nm may be chosen for retarder 55. Retarder 35 may have a retardation value of from about 220 nm to 320 nm according to certain embodiments of this invention, this range being defined on the lower end by ½ blue wavelength and on the upper end by ½ red wavelength. Preferably, retarder 35 has a retardation value of from about 270 to 290 nm, and most preferably about 280 nm. An exemplary retarder which may be used is positively birefringent uniaxial retarder Model No. NRF-280 available from Nitto-Denko. Alternatively, a pair of 140 nm retarders, for example, disposed adjacent one another may be used as retarder 35 to make up a 280 nm value.

The retardation value of retarder 35 may be chosen by a number of different methods according to alternative embodiments of this invention. Firstly, because green is typically the dominant wavelength emitted from backlight 37, the retardation value of retarder 35 may be chosen so as to be about ½ of the wavelength of the green peak emitted from backlight 37. Alternatively, according to other embodiments the retardation value "RV" of retarder 35 may be chosen so as to be about ½ of the center of mass of the visible spectrum emitted by backlight 37 into the display.

The choosing of the above-described retardation values "RV" for retarder 35 allows the polarization direction of the display image, when it reaches reflection point 11 on exterior medium or canopy 13 (see FIG. 7), to be substantially parallel to the plane of incidence thereby substantially reducing or even eliminating reflections of the image from point 11 when the display is arranged so that the angle of incidence substantially matches Brewster's angle. In other words, as shown in FIG. 7, when the polarization direction of image 13 is substantially parallel to the plane of incidence when it reaches reflection point 11, reflection is substantially eliminated when the Brewster angle is matched so that the image is transmitted at 47 through the exterior medium or canopy 13.

Optionally, additional retarders (not shown) may be provided between the polarizers, but for improving the viewing characteristics of the LCD.

Referring now to FIGS. 2, 3, 4, 7, and 8, in order to substantially reduce image reflections off of exterior medium (e.g. cockpit canopy or automotive windshield) 13 at reflection point 11, the following parameters must be substantially met. Firstly, as set forth above, the polarization direction of image 13 from display 21 must be substantially parallel to the plane of incidence when it reaches reflection point 11 on exterior medium 13. The YZ plane defines the plane of incidence and the Y-axis is a direction in the plane of incidence. Secondly, the Brewster angle must be matched by the image angle of incidence (i.e. the angle of incidence $\Theta_i$ is substantially equal to $\Theta_p$) at reflection point 11. Thirdly, retardation axis "R" of retarder 35 must be angularly arranged with respect to the front polarizer transmission axis FP so that the polarization direction of the image is substantially parallel to the plane of incidence (i.e. YZ plane) upon reaching reflection point 11. In order to satisfy this third requirement, retardation axis "R" (i.e. the slow axis of retarder 35) is arranged so as to substantially bisect the angle defined between the front polarizer transmission axis FP and a direction (e.g. Y-axis) defined in the plane of incidence.

As set forth above, the retardation value of retarder 35 may be from about 220–320 nm according to different embodiments of this invention, preferably from about 270 to 290 nm. According to certain embodiments of this invention, retardation value "RV" of retarder 35 changes as a function of φ (see FIG. 8) and is defined by the following equation:

$$RV = d \cdot \Delta n \backslash \cos \phi$$

where "d" is the thickness of retarder 35, "Δn" is the birefringent value of retarder 35, and "φ" as shown in FIG. 8 is the angle defined between image incident direction 43 from the display to point 11 and line 45 drawn normal to the front surface of display 21. This equation is satisfied as long as φ is less than or equal to about 30°. Thus, the retardation value RV of retarder 35 varies depending upon the location of reflection point 11 relative to display 21. Typically, φ is about 25°–30° according to certain embodiments of this invention, while the designed viewing angle of the display is equivalent to about φ=15°–25° (i.e. the pilot 7 or driver of the automobile views the display from about φ=15°–25°). When, however, φ is greater than about 30°, image 13 leaving display 21 cannot be assumed to be linearly polarized, and therefore a ½λ retarder cannot be assumed. In certain instances where φ is greater than about 30°, a biaxial retarder or even a negatively birefringent uniaxial retarder may be used so that the image, when it reaches reflection point 11, is polarized substantially parallel to the plane of incidence. When φ is greater than about 30°, elliptical polarization often results instead of linear polarization and thus the needs arises for a biaxial retarder (the index of refraction of which is different in all three directions) in order to compensate in the needed manner. As shown in FIG. 7, image 13 is substantially transmitted through medium 13 at 47 when reflection is substantially eliminated at point 11.

As shown in FIG. 3, front polarizer axis FP and rear polarizer access RP are at substantially right angles to one another, with both defining an angle of about 45° with the positive X-axis. The retardation axis "R" of retarder 35 defines an angle of about 22.5° with the positive Y-axis and likewise of about 22.5° with the front polarizer axis FP. In other words, axis "R" of retarder 35 substantially bisects the angle between the Y-axis and FP. To put it yet another way, axis "R" of retarder 35 is oriented at about half the rotation angle. Thus, by arranging retardation axis "R" at an angle of about 22.5° from front polarizer axis FP, it will be appreciated by those of skill in the art that (1) the light exiting front polarizer 33 of display 21 is polarized in a direction defined by the FP axis; and (2) the light exiting retarder 35 from the top of display 21 is changed so that it is polarized in a direction substantially parallel to both the positive Y-axis and the plane of incidence so that reflection at point 11 may be substantially eliminated when the angle of incidence $\Theta_i$ is substantially equal to the Brewster angle $\Theta_p$. Thus, the polarization direction of the image is rotated by retarder 35 from direction FP to a direction defined by the Y-axis.

The angle between "R" and FP is defined at 22.5° in FIG. 3. However, this angle may vary as a function of the direction of axis FP so that "R" always substantially bisects the angle defined between FP and the Y-axis when the Y-axis defines a direction in the plane of incidence. For example, if FP were arranged in alignment with the X-axis as shown in FIG. 3, then the 22.5° angle would change to an angle of about 45° in both instances.

FIG. 4 is a side elevational cross-sectional view of AMLCD 21 including from the rear forward toward the viewer, rear linear polarizer 25, rear substantially transparent glass or plastic substrate 51, pixel electrodes 53, rear orientation or buffing film 27, liquid crystal layer 29, front orientation or buffing film 31, common electrode 55, front substantially transparent glass or plastic substrate 57, front linear polarizer 33, and finally retarder 35. Selectively, a voltage is applied across liquid crystal layer 29 by way of pixel electrodes 53 in combination with common electrode 55 so as to selectively provide image data to the viewer (7 or 23).

It is noted at this time that the LCDs according to the different embodiments are also compatible with Polaroid sunglasses which pilots and automobile drivers like to wear during the daytime. Such sunglasses reduce reflections in scenery coming from shiny surfaces by cutting the horizontally polarized light as is known in the art. In prior art LCDs where FP is about 45° from the horizontal, about half the image light is cut by the sunglasses. However, when retarder 35 is used according to the embodiments of this invention as described herein, pilots and drivers wearing such sunglasses will be permitted to see the LCD image in full brightness.

FIGS. 4, 5, and 6 illustrate liquid crystal display 61 according to a second embodiment of this invention. This second embodiment is similar to the first embodiment except that the transmission axes of the polarizers and the retardation axis of the retarder are arranged in a different manner, the same result of substantial elimination of image reflection at point 11 still being obtained.

As shown in FIG. 5, LCD 61 includes rear polarizer 63 having its linear transmission axis RP being substantially parallel to front buffing direction 41. LCD 61 further includes front polarizer 65 having its linear transmission axis FP being substantially parallel to rear buffing direction 39. As in the first embodiment, buffing directions 39 and 41 define substantially a right angle with respect to one another (i.e. about 90°). The retardation axis "R" of retarder 67 is arranged in LCD 61 so that retardation axis "R" defines an angle of about 22.5° with respect to both the positive Y-axis and front polarizer transmission axis FP as shown in FIG. 6. Again, axis "R" is oriented so that it bisects the angle between FP and the Y-axis (i.e. the retarder 67 is oriented at about half the rotation angle). However, it is noted that the front polarizer transmission axis and the retarder axis are on the opposite side of the positive Y-axis as they were in the previous embodiment (compare FIGS. 3 and 6). However, displays 21 and 61' function in a similar manner in that when the image exits the front polarizer in both displays, it is polarized in a direction defined by transmission axis FP, but when it leaves the retarder, the polarization direction of the image in both displays 21 and 61 is substantially parallel to the plane of incidence so as to substantially eliminate reflection at point 11 when the Brewster angle is substantially matched by $\Theta_i$.

It is pointed out that the use of the different embodiments of this invention, in addition to cockpit applications, will find wide use in automotive applications where medium 13 is the windshield and LCD 21 is placed or located in the dashboard of the automobile so that $\Theta_i$ substantially equals $\Theta_p$ at reflection point 11. Additionally, this invention is applicable to any type of display (e.g. super twisted nematic LCD) that utilizes polarization and emits light with polarization directionality.

Once given the above disclosure, many other features, modifications, and improvements will become apparent to the skilled artisan. Such other features, modifications, and improvements are, therefore, considered to be a part of this invention, the scope of which is to be determined by the following claims.

We claim:

1. A liquid crystal display for directly transmitting an image to a viewer, the display comprising:

a liquid crystal layer;

front and rear linear polarizers sandwiching said liquid crystal layer therebetween;

the display being oriented so as to allow the viewer to directly view a transmitted image via a front surface of the display; and a retarder disposed adjacent to a front surface of the front polarizer having a retardation value and a retardation axis selected for reducing image reflections off of an external medium.

2. The display of claim 1, wherein a retardation value (RV) of said retarder is approximately defined by $$RV = \frac{d \cdot \Delta n}{\cos \phi}$$

where "d" is a thickness of said retarder, "Δn" a birefringent value of said retarder, and "φ" an angle defined between (i) a line or vector normal to the front surface of the display and (ii) a line or vector between a reflection point on the external medium and the front surface of the display.

3. A method of reducing liquid crystal display image reflections off of a reflection point on a substantially transparent external medium, the method comprising the steps of:

providing a liquid crystal display including a liquid crystal layer, at least a front polarizer or analyzer, and at least one retarder;

outputting an image from a front surface of the display toward a viewer so that the viewer directly views the image;

choosing a retardation value of the retarder for reducing reflections off of the substantially transparent external medium; and positioning the retarder on or adjacent the display so that the retarder is disposed between the liquid crystal layer and the external medium so as to reduce image reflections off of the substantially transparent external medium.

4. The method of claim 3, wherein the external medium is one of a cockpit canopy and an automobile windshield.

5. The method of claim 4, including the step of positioning the retarder adjacent the front polarizer so that the retarder is located between the external medium and the front polarizer.

* * * * *